(12) United States Patent
Sonnenschein et al.

(10) Patent No.: US 6,762,260 B2
(45) Date of Patent: Jul. 13, 2004

(54) ORGANOBORANE AMINE COMPLEX POLYMERIZATION INITIATORS AND POLYMERIZABLE COMPOSITIONS

(75) Inventors: Mark F. Sonnenschein, Midland, MI (US); Steven P. Webb, Midland, MI (US); Benjamin L. Wendt, Midland, MI (US); Daniel D. Harrington, Mount Pleasant, MI (US)

(73) Assignee: Dow Global Technologies Inc., Midland, MI (US)

( * ) Notice: Subject to any disclaimer, the term of this patent is extended or adjusted under 35 U.S.C. 154(b) by 73 days.

(21) Appl. No.: 10/095,326

(22) Filed: Mar. 5, 2002

(65) Prior Publication Data

US 2003/0181611 A1 Sep. 25, 2003

(51) Int. Cl.[7] .............................. C08G 4/52; B32B 27/00

(52) U.S. Cl. ........................ 526/196; 526/198; 526/197; 526/208; 526/230; 526/328; 526/329.1; 564/8; 564/9; 428/500; 428/515; 428/516; 428/520; 428/522

(58) Field of Search ................................ 526/196, 197, 526/208, 230, 328, 329.1; 564/8, 9; 428/500, 515, 516, 520, 522

(56) References Cited

U.S. PATENT DOCUMENTS

| | | | |
|---|---|---|---|
| 3,275,611 A | 9/1966 | Mottus et al. ............. | 260/80.5 |
| 3,819,447 A | 6/1974 | Dalibor et al. ............. | 156/330 |
| 4,426,243 A | 1/1984 | Briggs ..................... | 156/307.3 |
| 4,552,604 A | 11/1985 | Green ....................... | 156/124 |
| 4,705,838 A | 11/1987 | Goel .......................... | 528/48 |
| 4,746,725 A | 5/1988 | Evans et al. ................ | 528/370 |
| 5,106,928 A | 4/1992 | Skoultchi et al. ........... | 526/196 |
| 5,143,884 A | 9/1992 | Skoultchi et al. ........... | 502/160 |
| 5,204,386 A | 4/1993 | Ersun-Hallsby et al. .... | 423/443 |
| 5,250,228 A | 10/1993 | Baigrie et al. .............. | 252/511 |
| 5,286,821 A | 2/1994 | Skoultchi .................... | 526/196 |
| 5,310,835 A | 5/1994 | Skoultchi et al. ........... | 526/198 |
| 5,344,890 A | 9/1994 | Miyazono et al. ....... | 525/326.5 |
| 5,376,746 A | 12/1994 | Skoultchi .................... | 526/196 |
| 5,420,223 A | 5/1995 | Johnson ...................... | 528/91 |
| 5,539,070 A | 7/1996 | Zharov et al. .............. | 526/198 |
| 5,599,856 A | 2/1997 | Gardner ..................... | 523/453 |
| 5,616,796 A | 4/1997 | Pocius et al. ................ | 564/9 |
| 5,621,143 A | 4/1997 | Pocius ........................ | 564/8 |
| 5,674,941 A | 10/1997 | Cho et al. ................... | 525/102 |
| 5,679,458 A | 10/1997 | Cho et al. ................... | 428/412 |
| 5,681,910 A | 10/1997 | Pocius ........................ | 526/198 |
| 5,684,102 A | 11/1997 | Pocius et al. ............... | 526/198 |
| 5,686,544 A | 11/1997 | Pocius ........................ | 526/196 |
| 5,690,780 A | 11/1997 | Zharov et al. .............. | 156/332 |
| 5,691,065 A | 11/1997 | Zharov et al. .............. | 428/421 |
| 5,718,977 A | 2/1998 | Pocius ........................ | 428/422 |
| 5,721,281 A | 2/1998 | Blount ........................ | 521/50 |
| 5,795,657 A | 8/1998 | Pocius et al. ............... | 428/516 |
| 5,807,910 A | 9/1998 | Tseng et al. ................ | 523/428 |
| 5,817,376 A | 10/1998 | Everaerts et al. ........... | 427/483 |
| 5,837,155 A | 11/1998 | Inagaki et al. .............. | 216/18 |
| 5,859,155 A | 1/1999 | Furihata et al. ............. | 525/531 |
| 5,872,197 A | 2/1999 | Deviny ....................... | 526/192 |
| 5,883,208 A | 3/1999 | Deviny ....................... | 526/198 |
| 5,935,711 A * | 8/1999 | Pocius et al. ............... | 428/421 |
| 5,990,036 A | 11/1999 | Deviny ....................... | 502/162 |
| 5,994,484 A | 11/1999 | Pocius ........................ | 526/196 |
| 6,008,308 A | 12/1999 | Pocius ........................ | 526/196 |
| 6,027,813 A | 2/2000 | Deviny ....................... | 428/422 |
| 6,093,778 A | 7/2000 | Pocius ........................ | 526/196 |

FOREIGN PATENT DOCUMENTS

| | | |
|---|---|---|
| EP | 0 651 002 A2 | 5/1995 |
| WO | 96/19179 | 6/1996 |
| WO | 01/44311 A1 | 6/2001 |

OTHER PUBLICATIONS

Journal of Applied Polymer Science, vol. 43, (1991) pp. 2115–2121 "Grafting of Methyl Methacrylate onto Silk Initiated by Tri–n–Butylborne" M. Tsukada, et al.
Journal of Polymer Science, vol. 6, Pt. 2, (1968) pp. 3157–3162 "Vinyl Monomer Polymerization Merchanism in the Presence of Trialkylboranes" J. Grotewold, et al.
Journal of Polymer Science, vol. 61, (1962) pp. 241–261, Bailey and Kokle et al.
Derwent AN 1996–484098, SU 1457392A1, Dodonov et al.
Derwent AN 1997–010377, SU 1609117A1, Dodonov et al.
Derwent AN 1997–064052, SU 162491A1, Dodonov et al.
Journal of Applied Polymer Science, vol. 10, (1966), pp. 523–534, Proposed Mechanism for the Curing the Epoxy Resins with Amine–Lewis Acid Complexes or Salts.

(List continued on next page.)

Primary Examiner—Tatyana Zalukaeva
(74) Attorney, Agent, or Firm—Norman L. Sims

(57) ABSTRACT

The invention is a two part polymerizable composition comprising in one part an organoborane amine complex and one or more compounds containing ring opening heterocyclic moieties, and in a second part, compounds capable of being polymerized by free radical polymerization, a catalyst capable of polymerizing compounds containing ring opening heterocyclic moieties and optionally a component that will decomplex the organoborane amine complex. In one embodiment the invention is a two phase system comprising a first phase containing one or more polymers prepared from the compounds which polymerize by free radical polymerization and a second phase comprising polymerized or partially polymerized compounds derived from one or more compounds containing ring opening heterocyclic moieties. In one embodiment the polymer prepared from compounds containing heterocyclic ring opening moieties is not miscible with the polymer prepared by free radical polymerization and thus the resulting polymerized composition has at least two regions each rich in one of the two polymers formed. In another embodiment the polymerizable compositions of the invention can be formulated into adhesive compositions. Adhesive compositions of the present formulation provide excellent adhesion to low surface energy plastics from room temperature to temperatures over 125° C.

17 Claims, No Drawings

OTHER PUBLICATIONS

Plastics Technical Section, Dr. Gordon M. Kline, pp. 149, 150, 152, 154, 155, 158, 160, 186 (1964).
Modern Synthetic Reactions, Herbert O. House, pp. 786 (1972).
Derwent, 99–010842/02, DE 19738208–A1, Tseng T. et al.
Derwent 87–331368/47, J62236–878–A, Sumitomo Elec Ind. KK.
Derwent 88–202092/29, J63139–969–A, Kanegafuchi Chem KK.
Derwent 92–085634/11, J04029–393–A, Shinetsu Chem Ind KK.
Derwent 92–289585/35, JP04199694–A, Shinetsu Chem Ind Co Ltd.
Derwent 94–164114/20, JP06107907–A, Nippon Zeon KK.
Derwent 95–041525/06, JP06322324–A, Shinetsu Chem Ind Co Ltd.
Derwent 95–049086/07, JP0633015–A, Nissan Motor Co Ltd.
Derwent 97–529863/49, JP09208921–A, Shinetsu Chem Ind Co Ltd.
Chemical Abstract, 128:218101s, Acrylic Adhesive Compositions, Kimura, JP 10–046,125.
Derwent 98–189554/17, JP10046126–A, Nippon Synthetic Chem Ind Co.
Derwent 98–343543/30, JP10130612–A, Nippon Synthetic Chem Ind Co.
Derwent 98–357757/31, JP10140119–A, Nippon Synthetic Chem Ind Co.
Derwent 99–283642/24, JP11092593–A, Hitachi Chem Co. Ltd.
Derwent 96–453820/45, RU2054022–C1, Adgeziv Co. Ltd.
Chemical Abstract 116:195541w, Epoxy resin binder for commutator sheet mica, Ivanilova et al.
Derwent 84–159009/26, DD207436–A, Veb Filmfab Wolfen.
Derwent 90–332394/44, J02240130–A, Denki Kagaku Kogyo KK.
Derwent 1985–301176/48, SU 1155607, Kirakosyan, KII A.
Derwent 1990–332395, JP 02–240,131, Denki Kagaku Kogyo KK.
U.S. patent application Ser. No. 09/466,321, filed Dec. 17, 1999, Mark F. Sonnenschein et al., pending claims.
U.S. patent application Ser. No. 09/881,980, filed Jun. 15, 2001, Publication No. 2002–0058764, Mark F. Sonnenschein et al., pending claims.
U.S. patent application Ser. No. 09/881,983, filed Jun. 15, 2001, Publication No. 2002–0028894, Mark F. Sonnenschein et al., pending claims.
U.S. patent application Ser. No. 09/881,985, filed Jun. 15, 2001, Publication No. 2002–0033227, Mark F. Sonnenschein et al., pending claims.
U.S. patent application Ser. No. 09/882,510, filed Jun. 15, 2001, Publication No. 2002–0031607, Mark F. Sonnenschein et al., pending claims.
U.S. patent application Ser. No. 09/881,984, filed Jun. 15, 2001, Publication No. 2002–0025381, Mark F. Sonnenschein et al., pending claims.
U.S. patent application Ser. No. 10/012,629, filed Oct. 30, 2001, Publication No. 2003–0120005, Steven P. Webb et al., pending claims.
U.S. patent application Ser. No. 10/685,152, filed Oct. 14, 2003, Mark F. Sonnenschein et al., pending claims.
U.S. patent application Ser. No. 60/477,135, filed Jun. 9, 2003, Gary L. Jialanella et al., pending claims.
U.S. patent application Ser. No. 10/377,440, filed Feb. 28, 2003, Mark F. Sonnenschein et al., pending claims.
U.S. patent application Ser. No. 60/479,292, filed Jun. 18, 2003, Mark F. Sonnenschein et al., pending claims.

* cited by examiner

ORGANOBORANE AMINE COMPLEX POLYMERIZATION INITIATORS AND POLYMERIZABLE COMPOSITIONS

BACKGROUND OF THE INVENTION

This invention relates to polymerizable compositions comprising compounds containing moieties capable of free radical polymerization, organoborane amine complex initiators capable of initiating free radical polymerization and polymerizable compounds containing ring opening heterocyclic moieties, such as oxirane or aziridine moieties. In another embodiment the invention relates to a method of polymerizing compounds containing moieties capable of free radical polymerization and moieties containing oxirane or aziridine functionality capable of ring opening polymerization. In another embodiment, the invention relates to cured compositions having regions of free radically polymerized polymer and regions of polymers derived from ring opening compounds.

In many practical situations in which compounds are subjected to polymerization, for instance where the polymerizable compounds are used as adhesives, it is desirable to have polymerizable compositions and adhesive compositions that can cure on demand, by performing an operation such as heating, shearing or contacting two or more components containing reactive materials. Cure on demand means that the polymerization can be initiated when desired. A significant problem with cure on demand compositions is the stability of the compositions. Many such compositions at, or near, ambient temperature will cure partially resulting in an increased viscosity causing difficulties in handling and reduced functionality of the polymerizable composition or adhesive composition.

Low surface energy olefins such as polyethylene, polypropylene and polytetrafluroethylene have a variety of attractive properties in a variety of uses, such as toys, automobile parts, furniture applications and the like. Because of the low surface energy of these plastic materials, it is very difficult to find adhesive compositions that bond to these materials. The commercially available adhesives that are used for these plastics require time consuming or extensive pretreatment of the surface before the adhesive will bond to the surface. Such pretreatments include corona treatment, flame treatment, the application of primers, and the like. The requirement for extensive pretreatment of the surface results in significant limitations to the designers of automobile components, toys, furniture and the like.

A series of patents issued to Skoultchi (U.S. Pat. Nos. 5,106,928; 5,143,884; 5,286,821; 5,310,835 and 5,376,746 (all incorporated herein by reference)) disclose a two-part initiator system that is useful in acrylic adhesive compositions. The first part of the two-part system includes a stable organoborane amine complex and the second part includes a destabilizer or activator such as an organic acid or an aldehyde. The organoborane compound of the complex has three ligands which can be selected from $C_{1-10}$alkyl groups or phenyl groups. The adhesive compositions are disclosed to be useful in structural and semi-structural adhesive applications, such as speaker magnets, metal to metal bonding, automotive glass to metal bonding, glass to glass bonding, circuit board component bonding, bonding select plastics to metal, glass to wood, etc. and for electric motor magnets.

Zharov, et al. discloses in a series of U.S. Patents (U.S. Pat. Nos. 5,539,070; U.S. 5,690,780; and U.S. 5,691,065 (all incorporated herein by reference)) polymerizable acrylic compositions which are particularly useful as adhesives wherein organoborane amine complexes are used to initiate cure. It is disclosed that these complexes are good for initiating polymerization of an adhesive that bonds to low surface energy substrates.

Pocius in a series of patents (U.S. Pat No. 5,616,796; U.S. 5,621,143; U.S. 5,681,910; U.S. 5,686,544; U.S. 5,718,977; and U.S. 5,795,657 (all incorporated herein by reference)) disclose amine organoborane complexes with a variety of amines such as polyoxyalkylene polyamines and polyamines which are the reaction product of diprimary amines and compound having at least two groups which react with a primary amine. Pocius (U.S. Pat No. 5,686,544) discloses a composition comprising an organoborane polyamine complex, polyol and an isocyanate decomplexing agent.

Many of the complexes disclosed in the Zharov, Skoultchi and Pocius Patents are not stable in compositions containing olefinic unsaturation at, or near, ambient temperatures and thus the complexes disassociate and induce polymerization at, or near, ambient temperature with time. This instability at or near, ambient temperature can result in polymerization before desired and can result in compositions that are unsuitable for the desired use. Further, the compositions generally are two part compositions in which one side is a resin side and the other side is a hardener. One side (hardener) contains the organoborane complex and the other contains the decomplexing agent. In most cases the volume ratio of the two parts is significantly different, that is greater, than 4:1, often greater than 10:1. The problem is that most commercial equipment designed to dispense two part compositions utilizes ratios of 4:1 or less. In order to get these compositions to work in such equipment, resin or nonreactive ingredients are added to one side or the other to get a suitable volumetric ratio. The problem is that if resin is added to the side containing the complex, the mixture is unstable and could begin to cure at ambient temperatures and render the composition useless. If excessive inert materials are added to the hardener side, the inert ingredient can act as a plasticizer or create a weak continuous phase and negatively impact the properties of the polymerized composition.

After polymerization many of the compositions of the prior art demonstrate excellent stability, strength, and adhesion at or near ambient temperatures, but at elevated temperatures undergo significant loss of strength and adhesion at elevated temperatures. This limits the environments where substrates bonded using these adhesives can be used.

Therefore, there is a need for adhesive systems which are capable of bonding to low surface energy substrates, and initiator systems which facilitate such bonding. What are further needed are polymer compositions and adhesive systems which are thermally stable at, or near, ambient temperatures and which will undergo polymerization when the user desires. Also needed are adhesive compositions which are capable of bonding to low surface energy substrates, and bonding low surface energy substrates to other substrates, without the need for extensive or costly pretreatment. Further compositions that can be used in existing commercial equipment at mix ratios of 4:1 or less are needed. Compositions that have stability, strength and adhesion at elevated temperatures are also desired.

SUMMARY OF THE INVENTION

The invention is a two part polymerizable composition comprising in one part an organoborane amine complex and one or more compounds containing one or more ring opening heterocyclic moieties, and in a second part, compounds capable of being polymerized by free radical polymerization, a catalyst capable of polymerizing compounds containing ring opening heterocyclic moieties and optionally a component that will decomplex the organoborane amine complex. In one embodiment the invention is a two phase system comprising a first phase containing one or more polymers prepared from the compounds which polymerize by free radical polymerization and a second phase comprising polymerized or partially polymerized compounds derived from one or more compounds containing ring opening heterocyclic moieties. In one embodiment the polymer prepared from the compounds containing heterocyclic ring opening moieties is not miscible with the polymer prepared by free radical polymerization and thus the resulting polymerized composition has at least two regions each rich in one of the two polymers formed. In another embodiment the polymerizable compositions of the invention can be formulated into adhesive compositions. Adhesive compositions of the present formulation provide excellent adhesion to low surface energy plastics from room temperature to temperatures over 125° C.

The invention is also a method of polymerization comprising contacting the components of the polymerizable composition under conditions such that the polymerizable compounds undergo polymerization. In one embodiment, the contacting occurs at, or near, ambient temperature. In another embodiment, the method further comprises the step of heating the polymerized composition to an elevated temperature under conditions such that the compounds containing heterocyclic ring opening moieties may further react. This can improve the temperature resistance of the polymerized composition.

In yet another embodiment the invention is a method of bonding two or more substrates together which comprises contacting the components of the polymerizable composition together under conditions, such that polymerization is initiated; contacting the polymerizable composition with the two or more substrates; positioning the two or more substrates, such that the polymerizable composition is located between the two or more substrates; and allowing the polymerizable composition to polymerize and to bond the two or more substrates together.

In yet another embodiment the invention is a method of coating a substrate which comprises contacting a composition according to the invention with one or more surfaces of a substrate and initiating polymerization of the composition according to the invention.

In another embodiment the invention is a laminate comprising two substrates having disposed between the substrates and bound to each substrate a composition according to the invention.

In a preferred embodiment the catalyst capable of polymerizing compounds containing ring opening heterocyclic moieties is a Lewis acid. In the embodiment where the catalyst capable of polymerizing monomers or oligomers containing ring opening heterocyclic moieties is a Lewis acid, the Lewis acid can also function as the decomplexing agent. Where the decomplexing agent is not a Lewis acid catalyst, the decomplexing agent is preferably contained in the part having the catalyst capable of polymerizing compounds containing heterocyclic ring opening moieties and the compounds capable of free radical polymerization.

The complexes useful in the invention are safe to handle, i.e., not pyrophoric, are stable at, or near, ambient temperature and therefore will not initiate polymerization at, or near, ambient temperature in the absence of a decomplexing agent (initiator) that causes the complex to disassociate. The polymerizable compositions of the invention are stable at, or near, ambient temperature and can be cured upon demand by contacting the two parts of the composition, or alternatively by contacting the two parts of the composition and thereafter heating the compositions above the thermal disassociation temperature of the organoborane amine complex. Furthermore, the polymerizable compositions of the invention can form good bonds to low surface energy substrates without the need for primers or surface treatment. These polymerizable compositions can be used as adhesives, coatings or to laminate substrates together. The complexes and polymerizable compositions of the invention may be formulated to be dispensed in commercial equipment at volume ratios of the two parts of 4:1 or less. The polymerized compositions demonstrate excellent cohesive and adhesive strength at elevated temperatures and thus demonstrate excellent stability at high temperatures.

DETAILED DESCRIPTION OF THE INVENTION

The organoborane used in the complex is a trialkyl borane or an alkyl cycloalkyl borane. Preferably such borane corresponds to Formula 1:

$$B\text{-}(R^2)_3 \qquad \text{Formula 1}$$

wherein B represents Boron; and $R^2$ is separately in each occurrence a $C_{1-10}$alkyl, $C_{3-10}$cycloalkyl, or two or more of $R^2$ may combine to form a cycloaliphatic ring. Preferably $R^2$ is $C_{1-4}$alkyl, even more preferably $C_{2-4}$alkyl and most preferably $C_{3-4}$alkyl. Among preferred organoboranes are triethyl borane, tri-isopropyl borane and tri-n-butylborane.

The amines used to complex the organoborane compound can be any amine or mixture of amines which complex the organoborane and which can be decomplexed when exposed to a decomplexing agent. The desirability of the use of a given amine in an amine/organoborane complex can be calculated from the energy difference between the Lewis acid-base complex and the sum of energies of the isolated Lewis acid (organoborane) and base (amine) known as binding energy. The more negative the binding energy the more stable the complex.

Binding Energy=-(Complex Energy-(Energy of Lewis Acid+Energy of Lewis base))

Such binding energies can be calculated using theoretical ab-initio methods such as the Hartree Fock method and the 3-21G basis set. These computational methods are available commercially employing commercial software and hardware such as SPARTAN and Gaussian 98 programs with a Silicon Graphics workstation. Amines having amine/organoborane binding energies of 10 kilocalories per mol or greater are preferred, amines having a binding energy of 15 kilocalories per mol or greater are more preferred and even more preferred are amines with a binding 20 kilocalories per mol or greater are most preferred. In the embodiment where polymerization of the compositions of the invention is initiated by use of a decomplexing agent the binding energy of the amine to the organoborane is preferably about 50 kcal/mole or less and most preferably about 30 kcal/mole or less. In the embodiment where polymerization of the compositions of the invention is initiated by use of heat, the binding energy of the amine is preferably about 100 kcal/mole or less, more preferably about 80 kcal/mole or less and most preferably about 50 kcal/mole or less.

Preferred amines include the primary or secondary amines or polyamines containing primary or secondary amine groups, or ammonia as disclosed in Zharov U.S. Pat. No. 5,539,070 at column 5, lines 41 to 53, incorporated herein by reference, Skoultchi U.S. 5,106,928 at column 2, line 29 to 58, incorporated herein by reference, and Pocius U.S. 5,686,544 at column 7, line 29 to Column 10 line 36, incorporated herein by reference; ethanolamine, secondary dialkyl diamines or polyoxyalkylenepolyamines; and amine terminated reaction products of diamines and compounds having two or more groups reactive with amines as disclosed in Deviny U.S. 5,883,208 at column 7, line 30 to column 8 line 56, incorporated herein by reference. With respect to the reaction products described in Deviny the preferred diprimary amines include alkyl diprimary amines, aryl diprimary amines, alkyaryl diprimary amines and polyoxyalkylene diamines; and compounds reactive with amines include compounds which contain two or more moieties of carboxylic acids, carboxylic acid esters, carboxylic acid halides, aldehydes, epoxides, alcohols and acrylate groups. Preferred amines described in Deviny include n-octylamine, 1,6-diaminohexane (1,6-hexane diamine), diethylamine, dibutyl amine, diethylene triamine, dipropylene diamine, 1,3-propylene diamine (1,3-propane diamine), 1,2-propylene diamine, 1, 2-ethane diamine, 1,5-pentane diamine, 1,12-dodecanediamine, 2-methyl-1,5-pentane diamine, 3-methyl-1,5-pentane diamine, triethylene tetraamine, diethylene triamine. Preferred polyoxyalkylene polyamines include polyethyleneoxide diamines, polypropyleneoxide diamines, triethylene glycol propylene diamine, polytetramethyleneoxide diamine and polyethyleneoxidecopolypropyleneoxide diamines.

In one preferred embodiment, the amine comprises a compound having a primary amine and one or more hydrogen bond accepting groups, wherein there are at least two carbon atoms, preferably at least about three, between the primary amine and hydrogen bond accepting groups. Preferably, an alkylene moiety is located between the primary amine and the hydrogen bond accepting group. Hydrogen bond accepting group means herein a functional group that through either inter- or intramolecular interaction with a hydrogen of the borane-complexing amine increases the electron density of the nitrogen of the amine group complexing with the borane. Preferred hydrogen bond accepting groups include primary amines, secondary amines, tertiary amines, ethers, halogen, polyethers, thioethers and polyamines. In a preferred embodiment, the amine corresponds to Formula 2:

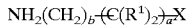  Formula 2 wherein:

R$^1$ is separately in each occurrence hydrogen, a C$_{1-10}$alkyl, C$_{3-10}$cycloalkyl or two or more of R$^1$ can form a cyclic ring structure which may have one or more cyclic rings; X is hydrogen bond accepting moiety; a is an integer of about 1 to about 10; and b is separately in each occurrence an integer of about 0 to about 1, and the sum of a and b is from about 2 to about 10. Preferably R$^1$ is hydrogen, methyl or two or more of R$^1$ combine to form a 5 or 6 membered cyclic ring. In a preferred embodiment X is a hydrogen bond accepting moiety with the proviso that when the hydrogen bond accepting moiety is an amine it is a tertiary or a secondary amine. Preferably the hydrogen bond accepting group has one or more nitrogen, oxygen, sulfur or halogen atoms in the group. More preferably X is separately in each occurrence —N(R$^8$)$_e$, —OR$^{10}$, —SR$^{10}$ or a halogen. R$^8$ is separately in each occurrence C$_{1-10}$alkyl, C$_{3-10}$cycloalkyl, —(C(R$^1$)$_2$)$_d$—W or two of R$^8$ may combine to form a structure having one or more cyclic rings. R$^{10}$ is separately in each occurrence, C$_{1-10}$alkyl, C$_{3-10}$cycloalkyl, or —(C(R$^1$)$_2$)$_d$—W. 'e' is separately in each occurrence 0, 1, or 2; and most preferably e is 2. More preferably X is —N(R$^8$)$_2$ or —OR$^{10}$. Preferably, R$^8$ and R$^{10}$ are C$_{1-4}$alkyl or —C(R$^1$)$_2$)$_d$—W, more preferably C$_{1-4}$alkyl and most preferably methyl. W is separately in each occurrence hydrogen or C$_{1-10}$alkyl or X and more preferably hydrogen or C$_{1-4}$alkyl. Where W is X, this represents the hydrogen bond accepting group has more than one hydrogen bond accepting moiety as described herein. Preferably, a is about 1 or greater and more preferably about 2 or greater. Preferably a is about 6 or less, and most preferably about 4 or less. Preferably, b is about 1. Preferably, the sum of a and b is an integer about 2 or greater and most preferably about 3 or greater. Preferably the sum of a and b are about 6 or less and more preferably about 4 or less. Preferably d is separately in each occurrence an integer of about 1 to about 4, more preferably about 2 to about 4, and most preferably about 2 to about 3. Among preferred amines corresponding to Formula 2 are dimethylaminopropyl amine, methoxypropyl amine, dimethylaminoethylamine, dimethylaminobutylamine, methoxybutyl amine, methoxyethyl amine, ethoxypropylamine, propoxypropylamine, amine terminated polyalkylene ethers (such as trimethylolpropane tris(poly(propyleneglycol), amine terminated) ether), and aminopropylpropanediamine.

In one embodiment the preferred amine complex corresponds to Formula 3:

  Formula 3 wherein R$^1$, R$^2$, X, a and b are as defined hereinbefore.

In another embodiment the amine is an aliphatic heterocycle having at least one nitrogen in the heterocycle. The heterocyclic compound may also contain one or more of nitrogen, oxygen, sulfur or double bonds. In addition, the heterocycle may comprise multiple rings wherein at least one of the rings has nitrogen in the ring. Preferably the aliphatic heterocyclic amine corresponds to Formula 4:

  Formula 4 wherein:

R$^3$ is separately in each occurrence hydrogen, a C$_{1-10}$alkyl, C$_{3-10}$cycloalkyl or forms a double bond with an adjacent atom. R$^{4'}$ is separately in each occurrence hydrogen, C$_{1-10}$alkyl or forms a cyclic ring with an R$^3$, Z or a substituent on Z. Z is separately in each occurrence sulfur, oxygen or —NR$^4$. R$^4$ is separately in each occurrence hydrogen, C$_{1-10}$alkyl, C$_{6-10}$aryl or C$_{7-10}$alkaryl. 'x' is separately in each occurrence an integer of about 1 to about 10, with the proviso that the total of all occurrences of x should be from about 2 to about 10. 'y' is separately in each occurrence 0 or 1. Two or more of R$^3$, R$^4$, and R$^4$ may combine to form cyclic rings thereby forming a multicyclic compound. Preferably, R$^3$ is separately in each occurrence hydrogen, methyl or forms a double bond with an adjacent atom. Preferably Z is $NR^4$. Preferably, $R^4$ is hydrogen or $C_{1-4}$alkyl, and more preferably hydrogen or methyl. Preferably, $R^4$ is hydrogen or $C_{1-4}$alkyl, more preferably hydrogen or methyl and most preferably hydrogen. Preferably x is from about 1 to about 5, inclusive, and the total of all the occurrences of x is about 3 to about 5. Preferred compounds corresponding to Formula 4 include morpholine, piperidine, pyrolidine, piperazine, 1,3,3 trimethyl 6-azabicyclo[3, 2,1] octane, thiazolidine, homopiperazine, aziridine, 1-amino-4-methylpiperazine, 3-pyrroline, aminopropyl morpholine and the like. Complexes containing aliphatic heterocyclic amines preferably correspond to Formula 5:

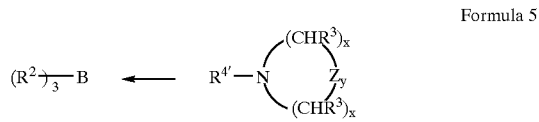

Formula 5 wherein $R^2$, $R^3$, $R^{4'}$, Z, x and y are as defined hereinbefore.

In yet another embodiment, the amine which is complexed with the organoborane is an amidine. Any compound with amidine structure wherein the amidine has sufficient binding energy as described hereinbefore with the organoborane, may be used. Preferable amidine compounds correspond to Formula 6:

Formula 6 wherein:

$R^5$, $R^6$, and $R^7$ are separately in each occurrence hydrogen, a $C_{1-10}$alkyl or $C_{3-10}$cycloalkyl; two or more of $R^5$, $R^6$, and $R^7$ may combine in any combination to form a ring structure, which may have one or more rings. Preferably $R^5$, $R^6$ and $R^7$ are separately in each occurrence hydrogen, $C_{1-4}$alkyl or $C_{5-6}$cycloalkyl. Most preferably $R^7$ is H or methyl. In the embodiment where two or more of $R^5$, $R^6$ and $R^7$ combine to form a ring structure the ring structure is preferably a single or a double ring structure. Among preferred amidines are 1,8 diazabicyclo[5,4]undec-7-ene; tetrahydropyrimidine; 2-methyl-2-imidazoline; and 1,1,3,3-tetramethylguanidine, and the like.

The organoborane amidine complexes preferably correspond to Formula 7: wherein $R^2$, $R^5$, $R^6$ and $R^7$ are as defined earlier.

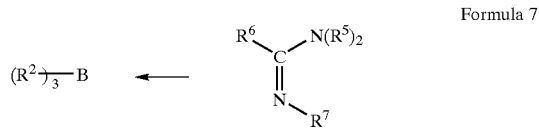

Formula 7

In yet another embodiment, the amine that is complexed with the organoborane is a conjugated imine. Any compound with a conjugated imine structure, wherein the imine has sufficient binding energy as described hereinbefore with the organoborane, may be used. The conjugated imine can be a straight or branched chain imine or a cylic imine. Preferable imine compounds correspond to Formula 8:

$NR^7CR^9=(CR^9—CR^9=CR^9)_cY$      Formula 8 wherein Y is independently in each occurrence hydrogen, $N(R^4)_2$, $OR^4$, $C(O)OR^4$, halogen, an alkylene group which forms a cyclic ring with $R^7$ or $R^9$. $R^9$ is independently in each occurrence hydrogen, Y, $C_{1-10}$alkyl, $C_{3-10}$cycloalkyl-, $(C(R^9)_2(CR^9=CR^9)_c-Y$ or two or more of $R^9$ can combine to form a ring structure provided the electron rich group in Y is conjugated with respect to the double bond of the imine nitrogen; and c is an integer of from about 1 to about 10. Preferably, $R^9$ is hydrogen or methyl. Y is preferably $N(R^4)_2$, $SR^4$, $OR^4$, or an alkylene group which forms a cyclic ring with $R^9$. Y is more preferably $N(R^4)_2$ or an alkylene group which forms a cyclic ring with $R^9$. Preferably, c is an integer of from about 1 to about 5, and most preferably about 1. Among preferred conjugated imines useful in this invention are 4-dimethylaminopyridine; 2,3-bis(dimethylamino) cyclopropeneimine; 3-(dimethylamino)acroleinimine; 3-(dimethylamino) methacroleinimine, and the like.

Among preferred cyclic imines are those corresponding to the following structures

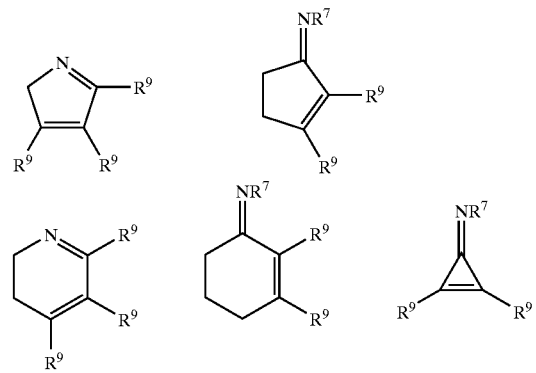

The complexes with the conjugated imines preferably correspond to Formula 9:

$(R^2)_3B\leftarrow NR^7=CR^9—CR^9=CR^9)_cY$      Formula 9 wherein $R^2$, $R^7$, $R^9$, c and Y are as defined hereinbefore.

In another embodiment the amine can be an alicyclic compound having bound to the alicyclic ring a substituent containing an amine moiety. The amine containing alicyclic compound may have a second substituent that contains one or more nitrogen, oxygen, sulfur atoms or a double bond. The alicyclic ring can contain one or two double bonds. The alicyclic compound may be a single or multiple ring structure. Preferably the amine on the first substituent is primary or secondary. Preferably the alicyclic ring is a 5 or 6 membered ring. Preferably functional groups on the second substituent are amines, ethers, thioethers or halogens. In a preferred embodiment the alicyclic compound with one or more amines containing substituent corresponds to Formula 10

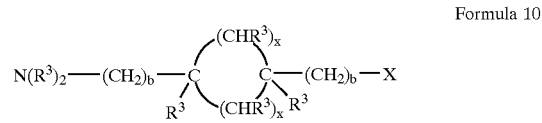

Formula 10 wherein $R^3$, X, b and x are as described hereinbefore. Included in amine substituted alicyclic compounds is isophorone diamine and isomers of bis(aminoethyl) cyclohexane.

Complexes using amine substituted alicyclic compounds correspond to Formula 11

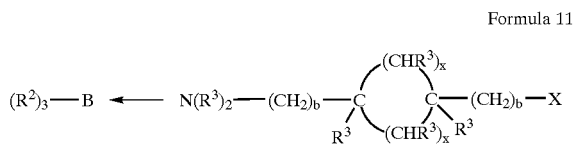

Formula 11 wherein $R^2$, $R^3$, X, b and x are as defined hereinbefore.

The equivalent ratio of amine compound(s) to borane compound in the complex is relatively important. An excess of amine is preferred to enhance the stability of the complex and in the embodiment where the decomplexing agent is an isocyanate functional compound to react with the isocyanate functional compound thereby resulting in the presence of polyurea in the final product. The presence of polyurea improves the high temperature properties of the composition.

Compounds capable of free radical polymerization which may be used in the polymerizable compositions of the invention include any monomers, oligomers, polymers or mixtures thereof which contain olefinic unsaturation which can polymerize by free radical polymerization. Such compounds are well known to those skilled in the art. Mottus, U.S. Pat. No. 3,275,611, provides a description of such compounds at column 2, line 46 to column 4, line 16, incorporated herein by reference. Among preferred classes of compounds containing olefinic unsaturation are monomers, oligomers, polymers and mixtures thereof derived from the acrylates and methacrylates; olefinically unsaturated hydrocarbons, for example ethylene, propylene, butylene, isobutylene, 1-octene, 1-dodecene, 1-heptadecene, 1-eicosene and the like; vinyl compounds such as styrene, vinyl pyridine, 5-methyl-2-vinylpyridine, vinyl napthylene, alpha methylstyrene; vinyl and vinylidiene halides; acrylonitrile and methacrylonitrile; vinyl acetate and vinyl propionate; vinyl oxyethanol; vinyl trimethylacetate; vinyl hexonate; vinyl laurate; vinyl chloroacetate; vinyl stearate; methyl vinyl ketone; vinyl isobutyl ether; vinyl ethyl ether; compounds that have a plurality of ethylenic bonds such as those having conjugated double bonds such as butadiene, 2-chlorobutadiene, isoprene; and the like. Examples of preferable acrylates and methacrylates are disclosed in Skoultchi, U.S. Pat. No. 5,286,821 at column 3, lines 50 to column 6, line 12, incorporated herein by reference and Pocius, U.S. Pat. No. 5,681,910 at column 9, line 28 to column 12, line 25, incorporated herein by reference. More preferred olefinic compounds include methyl acrylate, methylmethacrylate, butylmethacrylate, tert-butylmethacrylate, 2-ethylhexyacrylate, 2-ethylhexylmethacrylate, ethylacrylate, isobornylmethacrylate, isobornylacrylate, hydroxyethylmethacrylate, glycidylmethacrylate, tetrahydrofurfuryl methacrylate, acrylamide, n-methylacrylamide, and other similar acrylate containing monomers. Also useful are the class of acrylate tipped polyurethane prepolymers available commercially from several sources, and prepared by reacting an isocyanate reactive acrylate monomer, oligomer or polymer, such as a hydroxy acrylate, with an isocyanate functional prepolymer. Also useful in these compositions are acrylate crosslinkinking molecules including ethylene glycol dimethacrylate, ethylene glycol diacrylate, triethyleneglycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane trimethacrylate, isobornylmethacrylate and tetrahydrofurfuryl methacrylate. 61623 In the embodiment where the composition is used as an adhesive, acrylate and/or methacrylate based compounds are preferably used. The most preferred acrylate and methacrylate compounds include methylmethacrylate, butylmethacrylate, 2-ethylhexylmethacrylate, and cyclohexylmethylmethacrylate. Preferred amounts of acrylic monomer (acrylate and/or methacrylate based compounds) are preferably about 10 percent by weight or greater based on the total formulation weight, more preferably about 20 percent by weight or greater and most preferably about 30 percent by weight or greater. Preferred amounts of acrylic monomer (acrylate and/or methacrylate based compounds) are preferably about 90 percent by weight or less based on the total formulation weight, more preferably about 85 percent by weight or less and most preferred 80 percent by weight or less.

The two part polymerizable composition of this invention includes a polymerized portion comprising polymerized compound capable of free radical polymerization and a second portion comprising unpolymerized or partially polymerized compounds having ring opening heterocyclic moieties. The two portions can be miscible, partially miscible or immiscible. In a preferred embodiment the polymerized composition comprises two phases, one based on the compounds which polymerize through olefinic bonds and a second which polymerizes by a ring opening reaction of a heterocyclic moiety. The cured compositions of the invention preferably contain two regions that in many cases are not miscible. In some embodiments the two regions are separate phases or are interpenetrating networks of two different polymers. The two regions can be chemically bonded to one another if the composition includes a crosslinking compound.

The compound containing a heterocyclic ring opening moiety can be any monomer, oligomer or prepolymer containing a heterocyclic moiety capable of ring opening and polymerization. The heteroatom in the heterocyclic moiety is preferably nitrogen, oxygen or sulfur, with nitrogen and oxygen being preferred and oxygen being most preferred. Preferably the heterocyclic moiety is a 3 membered ring. Preferred heterocyclic moieties are oxirane and aziridine moieties, with oxirane moieties being most preferred. Preferred heterocyclic ring opening compounds contain moieties which correspond to Formula 12:

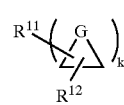

Formula 12

$R^{11}$ and $R^{12}$ represent independently in each occurrence a hydrocarbon based moiety optionally containing one or more nitrogen, oxygen, sulfur or halogen atoms. $R^{12}$ may optionally be hydrogen and may be bound to all possible positions on the ring not occupied by $R^{11}$. G represents independently in each occurrence oxygen, nitrogen or sulfur. 'k' represents separately in each occurrence an integer of from about 1 to about 10. More preferably $R^{11}$ is separately in each occurrence an aryl, alkaryl, aryl or a polyalkylene polyether based moiety. Preferably, G is oxygen or nitrogen and most preferably oxygen. More preferably, k is greater than 1 and even more preferably 2 or greater. More preferably, k is 6 or less and more preferably 4 or less and most preferably 3 or less. Oxirane, as used herein, refers to any compound having a glycidyl moiety. Such compounds are also referred to as epoxy resins. Representative of preferred epoxy resins useful in this invention are bisphenol based epoxy resins such as those disclosed in U.S. Pat. No. 5,308,895 at column 8, line 6 and represented by Formula 6 and flexible epoxy resins are those disclosed in at column 8, line 9 and Formula 9 and the description thereof following. Relevant portions of such description are incorporated herein by reference. Examples of such oxirane containing materials are diglycidylether of bisphenol A, tris 2-3-epoxypropylisocyanurate, tetraphenylolethane glycidylether, poly(phenyl glycidylether-co-formaldehyde), poly(phenyl glycidylether-co-dicyclopentadiene), and trimethylopropane triglycidyl ether, any other glycidyl modified aliphatic oxirane containing material, tetraglycidylmethyleneaniline, glycidylether modified poly(dimethylsiloxane), and any other glycidyl ether, glycidyl ester or glycidyl amine. Aziridine, as used herein, is refers to a three membered ring having a nitrogen in the ring. Examples of useful aziridine containing molecules are trimethylolpropane tris[2-methyl-1-aziridinepropionate], pentaerythritol tris[3-(1-aziridinyl)propionate], 2,4,6-Tris-aziridin-1-yl-(1,3,5)triazine, 2,3 diphenylaziridine, and 1-butyrylaziridine.

The presence of the polymer derived from the heterocyclic ring opening polymerizable compound, such as oxirane and aziridine, improves adhesion to higher surface energy plastics such as nylon, and also the thermal properties of the polymerized or partially polymerized compositions of the invention. A sufficient amount of the heterocyclic ring opening compound is used to improve the bonding to higher surface energy substrates and to improve the high temperature properties of the polymerized or partially polymerized composition. Thermal properties refer herein to higher glass transition temperatures of the polymerized compositions and improved cohesive strength at elevated temperatures, as evidenced by higher lap shear strengths at elevated temperature, such as 125 and 150° C.

The polymerizable formulation preferably contains a sufficient amount of heterocyclic ring opening polymerizable compound to improve significantly the glass transition temperature or lap shear strength at a given elevated temperature of the polymerizable formulation. A significant improvement of glass transition temperature is 5° C. A significant improvement in lap shear strength is about 50 psi or greater at 125° C. It is preferred that the total polymerizable formulation contain about 2 percent by weight of heterocyclic polymerizable compound or greater; more preferably about 5 percent by weight or greater and most preferred about 10 percent by weight or greater. It is preferred that the polymerizable formulation contain about 50 percent by weight or less, more preferably about 45 percent by weight of less and most preferably about 40 percent by weight or less of heterocyclic polymerizable compound.

In some cases it may be useful to crosslink the free radical polymerizable compound phase to the heterocyclic ring opening polymerizable compound derived phase. This is achieved using a bi-functional monomer, hereinafter referred to as a crosslinker, containing both olefinic unsaturation functionality, for instance, an acrylic moiety, and heterocyclic ring opening polymerizable functionality, or isocyanate functionality. Examples of this type of material include glycidyl acrylates, for instance glycidyl methacrylate, or isocyanato acrylates, such as 2-isocyanatoethyl methacrylate. Such compounds react under normal conditions of the reaction to react with reactive components in each phase of the polymerizable composition. The amount of crosslinker used is that amount which gives the desired properties, that is a sufficient lap shear strength at 125° C or above, yet does not cause the room temperature adhesive strength to go below the desired value. Preferred amounts of crosslinker are about 0 percent by weight or greater based on the weight of the polymerizable formulation, more preferably about 1 percent by weight or greater; even more preferably about 3 percent by weight or greater and most preferably about 5 percent by weight or greater. Preferably the amount of crosslinker used is about 20 percent by weight of the total polymerizable formulation or less; even more preferably about 15 percent by weight or less and most preferably about 12 percent by weight or less.

It is preferable that the heterocyclic ring opening polymerizable compound polymerize at a similar rate as the polymerization rate of the compounds containing moieties capable of free radical polymerization. If the reaction of one polymerizable component is too slow, the composition may vitrify prior to obtaining acceptable conversion of monomer to polymer of both phases. The unreacted components can act as a plasticizer and degrade properties, such as adhesion, thermal performance and the like. The properties of the final polymerized composition may be enhanced by post heating the polymerized composition to drive the completion of the polymerization of the heterocyclic polymerizable compounds. This is performed by heating the polymerized composition to a temperature above the glass transition temperature of the incompletely polymerized polymer(s). In this embodiment it is preferred to post cure at the expected use temperature of the structure, more preferred at 5° C. above the expected use temperature of the composition and most preferred to provide a thermal post cure of 10° C. above the expected use temperature of the polymerized composition Examples of post cure procedures are disclosed in Briggs (U.S. Pat No. 4,426,243) and Ersun-Hallsby, et al. (U.S. Pat No. 5,204,386), incorporated herein by reference.

In a preferred embodiment the ring opening polymerization of heterocyclic compounds is initiated by contacting the heterocyclic compounds with a Lewis acid catalyst as described by Arnold, R. J. Mod. Plastics, 41, 149 (1964), and J. Harris and S. Temin J. Appl. Polym Sci., 10, 523, (1966), both incorporated herein by reference. Any Lewis acid that initiates polymerization of the heterocyclic compounds may be used, such as those described in House, H. Modern Synthetic Methods $2^{nd}$ Edition, p. 786, (1972) incorporated herein by reference. Preferable Lewis acids include boron trichloride, boron trifluoride, tin tetrachloride, zinc dichloride, titanium tetrachloride and aluminum trichloride. In some embodiments, the Lewis acid may be complexed with a weak Lewis base to stabilize it in air against reaction with water vapor. Weak Lewis base as used herein means the Lewis base is a weaker Lewis base than the ring opening polymerizable compound in the composition for which the Lewis Acid is intended to catalyze poymerization. Among preferred Lewis Bases are amines, ketones and ethers. Particularly useful in these applications is amine and ether complexes of boron trifluoride ($BF_3$) and tin tetrachloride ($SnCl_4$). Tin tetrachloride can possess good shelf life in some adhesive formulations without the need for complexation. Preferable amines useful as complexation agents for the Lewis Acid include amine substituted aromatic compounds, such as aniline, substituted anilines, diphenyl amine, and substituted diphenyl amines.

Preferable ethers useful as complexation agents for the Lewis Acid include low boiling ethers (boiling point of less than 50° C.). Preferable ethers are dialkyl ethers, such as diethyl ether, and dimethyl ether and cycloaliphatic ethers, such as tetrahydrofuran. Preferred ketones include acetone.

Lewis acid catalysts are used in sufficient amounts to initiate polymerization of the heterocyclic moiety containing compounds, in particular they can be used in relatively small amounts, and stoichiometry does not need to be closely monitored as required with some curable. Preferably the amount of Lewis acid catalyst used is about 0.1 percent by weight of the total formulation or greater, more preferably about 0.25 percent by weight or greater and most preferably about 0.5 percent by weight or greater. Preferably the amounts of Lewis acid catalyst used is about 10 percent by weight of the total formulation or less, more preferably about 8 percent by weight or less and most preferably about 6 percent by weight or less.

The organoborane amine complexes useful for polymerization of the compounds having moieties capable of free radical polymerization require the application of a decomplexation agent that will displace the amine from the borane and initiate free radical polymerization. The displacement of the amine from the alkylborane can occur with any chemical for which the exchange energy is favorable, such as mineral acids, organic acids, Lewis acids, isocyanates, acid chlorides, sulphonyl chlorides, aldehydes, and the like. Preferred decomplexation agents are acids and isocyanates. In those embodiments where the initiator for the ring opening polymerization is a Lewis acid, the decomplexing agent may be omitted as Lewis acids may also function as the decomplexing agent. If the Lewis acid is used as the decomplexing agent and heterocyclic ring opening polymerization initiator no additional amounts are needed over those amounts needed to initiate polymerization. The choice of initiator may be impacted by the use of the polymerizable composition. In particular, where the polymerizable composition is an adhesive and the material to which it will be bonded is polypropylene, the preferred class of initiators is isocyanate initiators and where the substrate is nylon the preferred initiators are acids. Polymerization may also be initiated thermally. The temperature at which the composition is heated to initiate polymerization is dictated by the binding energy of the complex. Generally the temperature used to initiate the polymerization by decomplexing the complex is about 30° C. or greater and preferably about 50° C. or greater. Preferably the temperature at which thermally initiated polymerization is initiated is about 120° C. or less and more preferably about 100° C. or less. Any heat source that heats the composition to the desired temperature can be used, provided the heat source does not negatively impact the components of the composition or its function. In this manner the composition may be contacted with the substrates either before or after the composition is exposed to heat. If the composition is heated prior to contact with the substrates, the composition should be contacted with the substrates before the composition has polymerized to the point at which the composition is no longer able to adhere to the substrates. It may be necessary in the thermally initiated reaction to control the oxygen content such that there is adequate oxygen to create favorable conditions for radical formation but not so much as to inhibit the polymerization.

The two-part polymerizable compositions or adhesive compositions of the invention are uniquely suited for use with conventional, commercially available dispensing equipment for two-part compositions. Once the two-parts have been combined, the composition should be used quickly, as the useful pot life (open time) may be short depending upon the monomer mix, the amount of complex, the amount of Lewis acid catalyst and the temperature at which the bonding is to be performed. The adhesive compositions of the invention are applied to one or both substrates and then the substrates are joined together, preferably with pressure to force excess composition out of the bond line. In general, the bonds should be made shortly after the composition has been applied, preferably within about 10 minutes. The typical bond line thickness is about 0.005 inches (0.13 mm) to about 0.03 inches (0.76 mm). The bond line can be thicker if gap filling is needed as the composition of the invention can function as both an adhesive and a gap filler. The bonding process can easily be carried out at room temperature and to improve the degree of bonding it is desirable to keep the temperature below about 40° C., preferably below about 30° C., and most preferably below about 25° C.

The compositions may further comprise a variety of optional additives. One particularly useful additive is a thickener such as medium to high (about 10,000 to about 1,000,000) molecular weight polymethyl methacrylate which may be incorporated in an amount of about 10 to about 60 weight percent, based on the total weight of the composition. Thickeners may be employed to increase the viscosity of the composition to facilitate application of the composition.

Another particularly useful additive is an elastomeric material. The materials may improve the fracture toughness of compositions made therewith which can be beneficial when, for example, bonding stiff, high yield strength materials such as metal substrates that do not mechanically absorb energy as easily as other materials, such as flexible polymeric substrates. Such additives can be incorporated in an amount of about 5 percent to about 35 percent by weight, based on the total weight of the composition. Useful elastomeric modifiers include chlorinated or chlorosulphonated polyethylenes such as HYPALON 30 (commercially available from E. I. Dupont de Nemours & Co., Wilmington, Del.) and block copolymers of styrene and conjugated dienes (commercially available from Dexco Polymers under the Trademark VECTOR, and Firestone under the Trademark STEREON). Also useful, and even more preferred, are certain graft copolymer resins such as particles that comprise rubber or rubber-like cores or networks that are surrounded by relatively hard shells, these materials often being referred to as "core-shell" polymers. Most preferred are the acrylonitrile-butadiene-styrene graft copolymers available from Rohm and Haas. In addition to improving the fracture toughness of the composition, core-shell polymers can also impart enhanced spreading and flow properties to the uncured composition. These enhanced properties may be manifested by a reduced tendency for the composition to leave an undesirable "string" upon dispensing from a syringe-type applicator, or sag or slump after having been applied to a vertical surface. Use of more than about 20 percent of a core-shell polymer additive is desirable for achieving improved sag-slump resistance. Generally the amount of toughening polymer used is that amount which gives the desired toughness to the polymer or the adhesive prepared.

Small amounts of inhibitors, such as the methyl ether of hydroquinone (MEHQ) or hindered phenols, may be used, for example, to prevent or reduce degradation of the olefinic monomers during storage. Inhibitors may be added in an amount that does not materially reduce the rate of polymerization or the ultimate properties of an adhesive or other composition made therewith, typically about 10 to about 10,000 ppm based on the weight of the polymerizable monomers.

In some embodiments where the heterocyclic ring opening compound is an oxirane, it may be desirable to include some aziridine containing compound in the formulation as the aziridine enhances the stability of the formulation. Generally, enough aziridine is added to improve the stability of the formulation. To improve the stability means herein that the viscosity increase is no more than 50 percent over a one month time period. Preferably about 1 percent by weight or greater of aziridine based on the weight of the formulation is used and more preferably about 2 percent by weight or greater. Preferably about 10 percent by weight or less of aziridine based on the formulation weight is used and more preferably about 7 percent by weight or less is used.

Polymerizable compositions according to the invention may be used in wide variety of ways, including as sealants, coatings, primers, to modify the surface of polymers, and injection molding resins. They may also be used as matrix resins in conjunction with glass and metal fiber mats such as in resin transfer molding operations. They may further be used as encapsulants and potting compounds such as in the manufacture of electrical components, printed circuit boards and the like. Quite desirably, they provide polymerizable adhesive compositions that can bond a diverse myriad of substrates, including polymers, wood, ceramics, concrete, glass and primed metals. Another desirable related application is their use in promoting adhesion of paints to low surface energy substrates such as polyethylene, polypropylene, polyethyleneterephthalate, polyamides, and polytetrafluoroethylene, and their co-polymers. In this embodiment the composition is coated onto the surface of the substrate to modify the surface to enhance the adhesion of the final coating to the surface of the substrate.

The compositions of the invention can be used in coating applications. In such applications the composition may further comprise a carrier such as a solvent. The coating may further contain additives well known to those skilled in the art for use coatings, such as pigments to color the coating, inhibitors and UV stabilizers. The compositions may also be applied as powder coatings and may contain the additives well known to those skilled in the art for use in powder coatings.

The compositions of the invention can also be used to modify the surface of a polymeric molded part, extruded film or contoured object. Compositions of the invention can also be used to change the functionality of a polymer particle by surface grafting of polymer chains on to the unmodified plastic substrate.

Polymerizable compositions of the invention are especially useful for adhesively bonding low surface energy plastic or polymeric substrates that historically have been very difficult to bond without using complicated surface preparation techniques, priming, etc. By low surface energy substrates is meant materials that have a surface energy of about 45 mJ/m$^2$ or less, more preferably about 40 mJ/m$^2$ or less and most preferably about 35 mJ/M$^2$ or less. Included among such materials are polyethylene, polypropylene, acrylonitrile-butadiene-styrene, polyamides, syndiotactic polystyrene, olefin containing block co-polymers, and fluorinated polymers such as polytetrafluoroethlene (TEFLON) which has a surface energy of less than about 20 mJ/m$^2$. (The expression "surface energy" is often used synonymously with "critical wetting tension" by others.) Other polymers of somewhat higher surface energy that may be usefully bonded with the compositions of the invention include polycarbonate, polymethylmethacrylate, and polyvinylchloride.

The polymerizable compositions of the invention can be easily used as two-part adhesives. The components of the polymerizable compositions are blended as would normally be done when working with such materials. The decomplexing agent for the organoborane amine complex is usually included with the olefinic, polymerizable component so as to separate it from the organoborane amine complex, thus providing one-part of the two-part composition. The organoborane amine complex of the polymerization initiator system provides the second part of the composition and is added to the first part shortly before it is desired to use the composition. Similarly, the Lewis acid catalyst for the heterocyclic ring opening compound polymerization is kept separate from the heterocyclic ring opening compound. The Lewis acid catalyst may be added to the first part directly or it may be pre-dissolved in an appropriate carrier such as a reactive olefinic monomer, i.e., methyl methacrylate or a MMA/PMMA viscous solution.

For a two-part adhesive such as those of the invention to be most easily used in commercial and industrial environments, the volume ratio at which the two-parts are combined should be a convenient whole number. This facilitates application of the adhesive with conventional, commercially available dispensers. Such dispensers are shown in U.S. Pat. Nos. 4,538,920 and 5,082,147 (incorporated herein by reference) and are available from Conprotec, Inc. (Salem N.J.) under the trade name MIX-PAC. Typically, these dispensers use a pair of tubular receptacles arranged side-by-side with each tube being intended to receive one of the two-parts of the adhesive. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two-parts. The blended adhesive is extruded from the mixing chamber onto a substrate. Once the tubes have been emptied, they can be replaced with fresh tubes and the application process continued.

The ratio at which the two-parts of the adhesive are combined is controlled by the diameter of the tubes. (Each plunger is sized to be received within a tube of fixed diameter, and the plungers are advanced into the tubes at the same speed.) A single dispenser is often intended for use with a variety of different two-part adhesives and the plungers are sized to deliver the two-parts of the adhesive at a convenient mix ratio. Some common mix ratios are 1:1, 2:1, 4:1 and 10:1, but preferably less than about 10:1 and more preferably less than about 4:1.

Preferably the mixed two-part compositions of the invention have a suitable viscosity to allow application without dripping. Preferably, the viscosities of the two individual components should be of the same order or magnitude. Preferably the mixed compositions have the viscosity of about 100 (0.1 Pa.S) centipoise or greater, more preferably about 1,000 (1.0 Pa.S) centipoise or greater and most preferably about 5,000 (5.0 Pa.S) centipoise or greater. Preferably the adhesive compositions have a viscosity of about 150,000 (150 Pa.S) centipoise or less, more preferably about 100,000 (100 Pa.S) centipoise or less and most preferably about 50,000 (50 Pa.S) centipoise or less.

Specific Embodiments

The following examples are included for illustrative purposes only and are not intended to limit the scope of the claims. Unless otherwise stated all parts and percentages are by weight.

Preparation of Adhesive Compositions

Two component (part) adhesives are produced as described below. One component (hardener) includes the organoborane amine complex mixed with oxirane or aziridine containing monomers or oligomers. In some cases the borane amine complex and the oxirane or aziridine containing materials are diluted with methylmethacrylate (MMA) and Polymethylmethacrylate (PMMA), or other fillers, so as to obtain an appropriate mixing volume or viscosity. The other component (resin) contains the Lewis acid catalyst, acrylic resin and an optional decomplexing agent (for the organoborane amine complex), for example, acrylic acid or an isocyanate, such as, isophorone diisocyanate. The acrylic resin is a mixture of Methylmethacrylate (MMA) and Polymethylmethacrylate (PMMA). In the present invention all resin mixtures are an 80/20 MMA/PPMA mixture, by weight, where the PMMA is nominally 350,000 Daltons molecular weight. The MMA and PMMA are stirred or rotated overnight to mix the PMMA into the MMA. Tougheners and fillers, such glass beads, can be added to either side as long as they do not interfere with the shelf life of the adhesive components.

The adhesive may be mixed at the desired volume ratio in air, in a bag, or through a pressurized gun. The adhesive is applied to test strips 1 inch (25.4 mm) wide by ⅛" (3.2 mm) thick with a ½ inch (12.7 mm) overlap, using polypropylene for low temperature, or using Nylon, Syndiotactic Polystyrene (sPS)/Nylon, or e-coated steel for high temperature and tested for adhesive strength as described hereinafter. The adhesive components are mixed and applied to one or both substrates. Adhesive thickness may be controlled by the addition of a few weight percent of glass beads between 0.005 to 0.030 inches in diameter (0.13 mm to 0.76 mm). The coupons are mated to provide 0.25 inch squared (80 mm$^2$) to 1.0 inch squared (645 mM$^2$) substrate overlap in a lap-shear testing configuration. The samples are held in place with metal binder clips to provide constant force and facilitate the elimination of air bubbles in the adhesive during cure. The bonded samples were usually cured for at least about 24 hours before being mounted in a tensile testing apparatus (Instron) fitted with a sample oven. The samples are evaluated at crosshead speeds of 0.05 (0.13 mm) and 0.5 (13.0 mm) inches per minute for room temperature and high temperature (>100° C.) testing conditions, respectively. Maximum load (pounds) to break are recorded and maximum stress (psi) is calculated by dividing this load by the overlap area (inches squared). For high temperature testing the test strip is equilibrated to the desired temperature in the Instron tester's oven for at least 5 minutes before the test is started.

The Following Abbreviations are Used in the Following Tables.

MMA is methyl methacrylate
PMMA is poly(methylmethacrylate)
AA is acrylic acid
GMA is glycidyl methacrylate
TEB is triethylborane
TBB is tri n-butylborane
MOPA is 3-methoxy propylamine
IPDA is isophorone diamine
DMAPA is N,N-dimethylamino 3-propylamine
IPDI is isophorone diisocyanate
DGEBA is the diglycidylether of bisphenol-A
TRIPOX is trimethylolpropane triglycidylether
TRIS is Tris (2,3 epoxypropyl) isocyanurate
TPE-GE is tetraphenylolethane glycidylether
PPGEF is poly((phenyl glycidylether)-co-formaldehyde)
PPGEDC is poly((phenyl glycidylether)-co-dicyclopentadiene)
TRIZ is trimethylolpropane tris(2-methyl-1-aziridine propionate)
BF$_3$ is trifluoroborane
BF$_3$O(Me)$_2$ is the dimethylether complex of boron trifluoride
BF$_3$O(ET)$_2$ is the diethylether complex of boron trifluoride
BF$_3$THF is the tetrahydrofuran complex of boron trifluoride
SnCl$_4$ is tin tetrachloride
ZnCl$_2$ is zinc dichloride
iPP is isotactic polypropylene 6524, a product of Basell Inc., Wilmington, Del.
Nylon is, in all cases, a heat-stabilized, 35% glass-filled nylon 6, a product of The Dow Chemical Company
SPS-Nylon is, in all cases, a 30% sPS (syndiotactic polystyrene)/ 35% glass-filed, heat-stabilized nylon 6 blend, a product of The Dow Chemical Company
PET is in all cases a mineral filled PET product of Ticona Corporation designated EKX-215
PTFE is polytetrafluoroethylene purchased in mechanical grade sheet form from McMaster-Carr Corporation, Cleveland, Ohio.
Iceman is 2-isocyanatoethyl methacrylate
EGDM is ethylene glycol dimethacrylate
TEPA is tetraethylpentamine
VS5500 is a hollow glass sphere, a product of 3M Corp., Minneapolis, Minn.
GLY is glycidol (2-glycidyl ethanol)
Paraloid Exl-2691 is a MBS based core shell rubber(a methyl methacrylate based polymer shell with a styrene butadiene copolymer shell available from Rohm and Haas).
Kelpoxy 6272-100 is an epoxy terminated CTBN (carboxyl terminated butadiene acrylonitrile copolymer available from Reichhold.
ATBN 1300X16 Polymer is amine terminated butdiene acrylonitrile copolymer available from BF Goodrich Examples 1–3.

The formulations used in these examples comprise two components one containing acrylic resin, acrylic acid and a BF$_3$-ether complex and the other component containing TBB-DMAPA complex in TRIPOX in the ratio of 0.72: 0.04: 0.01: 0.04: 0.18 parts (acrylic resin, acrylic acid, a BF$_3$-ether complex, TBB-DMAPA complex, TRIPOX). The adhesive was applied to iPP substrates and tested at room temperature. The results are compiled in Table 1.

TABLE 1

| Example | BF3 complex | Lap shear strength psi (kPA) | Failure mode |
| --- | --- | --- | --- |
| 1 | BF$_3$O(Me)$_2$ | 517 (3565) | substrate |
| 2 | BF$_3$O(Et)$_2$ | 554 (3820) | substrate |
| 3 | BF$_3$THF | 324 (2234) | adhesive |

Table 1 shows that the adhesive will obtain good adhesion with all of the tested ether complexes of BF$_3$, but that the best adhesion is obtained when the ether is capable of volatilizing from the adhesive as it cures, in particular the complexes in Examples 1 and 2 volatilize away during cure. Substrate failure means the substrate broke prior to the adhesive failing. Adhesive failure means the bond of the adhesive to the substrate surface breaks at the stated lap shear strength.

EXAMPLES 4 to 7

The formulations used in these examples were the same as in Examples 1 to 3 except all adhesives were catalyzed with $BF_3O(Me)_2$, and the oxirane containing monomer was varied. Adhesives were applied to iPP and tested at room temperature as described before. The results are compiled in Table 2.

TABLE 2

| Example | Oxirane component | Oxirane Functionality | Lap Shear strength psi (kPA) | Failure mode |
|---|---|---|---|---|
| 4 | TRIPOX | 3 | 517 (3565) | substrate |
| 5 | TRIS | 3 | 792 (5461) | substrate |
| 6 | TPE-GE | 4 | 619 (4268) | substrate |
| 7 | DGEBA | 2 | 480 (3309) | Mixed sub/c-a |

Table 2 shows that while all of the oxirane containing monomers provided excellent adhesion to iPP, the use of monomers with functionality greater than 2 result in better adhesion to the surface. Mixed sub/c-a means that the substrate developed a crack which initiated a cohesive failure in the adhesive (c/a).

EXAMPLES 8 to 13

Examples 8 to 13 demonstrate the effect of a crosslinking compound, GMA (glycidyl methacrylate), on room temperature and higher temperature adhesion. In all experiments the oxirane component is 20 percent of the total adhesive weight and is catalyzed by $BF_3O(Me)_2$ at 1 percent of the total adhesive weight. The acrylic monomer component polymerization is catalyzed by TBB-MOPA complex at 4 percent based on the total adhesive weight. The amount GMA added to the formulation replaces the same amount of acrylic resin component in the formulation. The substrate tested was iPP. The results are compiled in Table 3.

TABLE 3

| Example | Test Temperature ° C. | % GMA | Lap shear strength psi (kPA) | Failure mode |
|---|---|---|---|---|
| 8 | 25 | 0 | 413 (2848) | mixed |
| 9 | 25 | 5 | 432 (2979) | mixed |
| 10 | 25 | 10 | 592 (4082) | substrate |
| 11 | 125 | 0 | 88 (607) | c/a |
| 12 | 125 | 5 | 92 (634) | c/a |
| 13 | 125 | 10 | 141 (972) | c/a |

Table 3 shows that addition of GMA, which crosslinks the polymerized oxirane monomer to the acrylic polymer, can increase the performance of the adhesive at room temperature and particularly at elevated temperatures. Mixed means that adhesive was present to the naked eye on the bond area, yet both substrates also had regions that appeared to have no residual adhesive. 'c/a' means that both substrates appeared covered with some adhesive over the entire bond region.

EXAMPLES 14 to 23

Examples 14 to 23 illustrate the effect of Lewis acid, $BF_3$, concentration in the adhesive on the high temperature adhesion properties of adhesive bonded structures. In all cases the substrate is a blend of sPS in nylon and the adhesive is as described in Experiments 10 and 13 except the amount of $BF_3O(Me)_2$ is varied displacing acrylic resin as its quantity is increased. All the lap shear measurements were performed at 150° C. The samples cured at room temperature were compared to identical samples following an oven cure at 120° C. followed by 24 hour equilibration back to room temperature. All failures were cohesive adhesive, meaning the polymer of the adhesive broke at failure. The results are compiled in Table 4.

TABLE 4

| Example | Cure temp ° C. | Percent $BF_3O(Me)_2$ | Lap shear strength psi (kPA) |
|---|---|---|---|
| 14 | 25 | 1 | 126 (869) |
| 15 | 25 | 2 | 158 (1089) |
| 16 | 25 | 3 | 178 (1227) |
| 17 | 25 | 4 | 216 (1489) |
| 18 | 25 | 5 | 290 (1999) |
| 19 | 120 | 1 | 295 (1413) |
| 20 | 120 | 2 | 200 (1379) |
| 21 | 120 | 3 | 198 (1365) |
| 22 | 120 | 4 | 235 (1620) |
| 23 | 120 | 5 | 237 (1634) |

Table 4 shows that increasing the amount of catalyst for oxirane polymerization can drive polymerization of the oxirane to completion, thus eliminating the need for a heat post-cure while maintaining very good elevated temperature performance.

EXAMPLES 24 to 37

Examples 24 to 37 were designed to show the impact of the presence of toughener on some formulations of adhesive in the present invention. In these experiments 40 percent of the total adhesive weight was TPE-GE and its polymerization is catalyzed by $BF_3O(Me)_2$, at 1 percent of the total adhesive weight. The acrylic polymerization was catalyzed by TBB-MOPA complex comprising 4 percent of the total adhesive weight and the free radical polymerization was initiated using acrylic acid (AA) comprising 4 percent of the adhesive weight. Toughener mass was added and displaced acrylic resin from the adhesive formulation. Adhesive was applied to nylon substrate in a lap shear configuration, cured for 18 hours at room temperature followed by 1.5 hours at 130° C. All testing of lap shears was at 25° C. or 150° C. The results are compiled in Table 5.

TABLE 5

| Example | Toughener | Percent toughener | Test Temp ° C. | Lap Shear strength psi (kPA) |
|---|---|---|---|---|
| 24 | Paraloid Ex1-2691 | 1 | | NA[1] |
| 25 | Paraloid Ex1-2691 | 5 | | NA[1] |
| 26 | Paraloid Ex1-2691 | 10 | | NA[1] |
| 27 | Kelpoxy 6272-100 | 1 | 25 | 350 (2413) |
| 28 | Kelpoxy 6272-100 | 5 | 25 | 450 (3103) |
| 29 | Kelpoxy 6272-100 | 10 | 25 | 544 (3751) |
| 30 | Kelpoxy 6272-100 | 1 | 150 | 116 (800) |
| 31 | Kelpoxy 6272-100 | 5 | 150 | 130 (896) |
| 32 | Kelpoxy 6272-100 | 10 | 150 | 100 (689) |
| 33 | ATBN 1300X16 Polymer | 1 | 25 | 315 (2172) |
| 34 | ATBN 1300X16 Polymer | 5 | 25 | 521 (3592) |
| 35 | ATBN 1300X16 Polymer | 10 | 25 | 1073 (7398) |
| 35 | ATBN 1300X16 Polymer | 1 | 150 | 122 (841) |
| 36 | ATBN 1300X16 Polymer | 5 | 150 | 151 (1041) |
| 37 | ATBN 1300X16 Polymer | 10 | 150 | 243 (1675) |

[1]The Paraloid toughener was unsuitable since it thickened the adhesive at all concentrations to unsuitable viscosities.

Table 5 shows that toughening adhesives of the current invention can provide improvement in both room temperature and lower temperature performance in Lap Shear testing.

EXAMPLES 38 and 39

Examples 38 and 39 utilized adhesives formulated with 40 percent by weight of TPE-GE, 51 percent acrylic resin, 1 percent $BF_3O(Me)_2$, 4 percent TBB:MOPA complex and 4 percent AA. The substrate tested was nylon in a lap shear configuration. Adhesive bonded structures were initially cured for 18 hours at room temperature followed by 8 hours at 120° C. The failure mode in each case was cohesive adhesive. The results are compiled in Table 6.

TABLE 6

| Example | Test temp. ° C. | Lap Shear strength psi (kPA) |
|---|---|---|
| 38 | 150 | 700 (4826) |
| 39 | 170 | 330 (2275) |

Table 6 shows that the adhesives of the present invention can provide very high adhesion to substrates at temperatures 50° C. above the glass transition temperature of the majority phase, polyacrylate. Adhesives of the present invention can provide high temperature performance not observed with previous adhesives designed to adhere to low surface energy plastic substrates.

EXAMPLES 40 to 47

Examples 40 to 47 demonstrate the ability of Lewis acid catalysts to impart adequate reactivity to the adhesives of this invention, and to provide excellent adhesion to plastics without post-cure. These experiments provide data for a variety of oxirane containing monomers and oligomers formulated with acrylic resin and GMA. The ratio of oxirane containing monomer/GMA/catalyst used is indicated in the column labeled "ratio". The $SnCl_4$ was used as a neat liquid and the $ZnCl_2$ as a 1.0M solution in diethyl ether. The rest of the formulation contained acrylic resin and 4 percent by weight TBB:MOPA complex. All adhesives were applied to nylon substrates in a lap shear structure The results are compiled in Table 7.

TABLE 7

| Example | catalyst | oxirane | Ratio | Test temp ° C. | Cure temp ° C. | Lap shear strength psi (kPA) |
|---|---|---|---|---|---|---|
| 40 | $SnCl_4$ | TRIS | 20/10/2 | 25 | 25 | 700 (4826) |
| 41 | $SnCl_4$ | TRIS | 30/10/2 | 25 | 25 | 600 (4137) |
| 42 | $SnCl_4$ | TRIS | 10/10/6 | 150 | 125 | 440 (3034) |
| 43 | $SnCl_4$ | TRIS | 30/10/6 | 150 | 125 | 350 (2413) |
| 44 | $SnCl_4$ | PPGEDC | 10/10/6 | RT | 25 | 390 (2689) |
| 45 | $SnCl_4$ | PPGEDC | 10/10/6 | 150 | 25 | 470 (3241) |
| 46 | $ZnCl_2$ | TRIS | 20/10/2 | 25 | 25 | 687 (4737) |
| 47 | $ZnCl_2$ | TRIS | 20/10/4 | 25 | 25 | 607 (4185) |

Table 7 shows that Lewis acids, such as tin tetrachloride and zinc dichloride, are good catalysts in a variety of formulations with different monomers and different catalyst levels.

EXAMPLES 48 to 51

Examples 48 to 51 demonstrate the ability of adhesives of the present invention to bond to a variety of plastics. The adhesive comprises 20 percent TRIS, 10 percent GMA, 2 percent $BF_3O(Me)_2$, 4 percent TBB-MOPA complex and the balance acrylic resin. The cure and test temperature was in each case 25° C. All samples were tested in the lap shear configuration. The results are compiled in Table 8.

TABLE 8

| Example | Substrate | Lap shear strength psi (kPA) | Failure mode |
|---|---|---|---|
| 48 | iPP | 640 (4413) | substrate |
| 49 | Nylon | 440 (3034) | Cohesive adhesive |
| 50 | PET | 1008 (6450) | Cohesive adhesive |
| 51 | PTFE | 303 (2089) | substrate |

The data in Table 8 demonstrates that the adhesives of the present invention are capable of providing excellent adhesion to a wide variety of low surface energy substrates.

EXAMPLES 52 to 60

Examples 52 to 60 demonstrate the effectiveness of mixing oxirane and aziridine containing monomers or oligomers in adhesive resins for bonding to low surface energy substrates. Examples 52 to 60 were performed on iPP substrates. All adhesives were 20 percent TRIS and 4 percent TBB-IPDA complex. The remainder of the composition was acrylic resin, aziridine, $BF_3$ complex (complexed with dimethylether) GMA, the percents of the last three components are compiled in Table 8. All samples were cured at room temperature and tested at 25° C. The results are compiled in Table 9.

TABLE 9

| Example | $BP_3$ Percent | TRIZ Percent | GMA Percent | Lap shear strength psi (kPA) | Failure mode |
|---|---|---|---|---|---|
| 52 | 2 | 10 | 0 | 624 (4302) | C/A |
| 53 | 4 | 10 | 0 | 1010 (6964) | substrate |
| 54 | 2 | 5 | 0 | 795 (5481) | substrate |
| 55 | 2 | 5 | 10 | 1141 (7867) | substrate |
| 56 | 4 | 5 | 10 | 608 (4190) | mixed |
| 57 | 2 | 2.5 | 0 | 1023 (7053) | substrate |
| 58 | 4 | 2.5 | 0 | 332 (2289) | adhesive |
| 59 | 4 | 15 | 0 | 229 (1579) | adhesive |
| 60 | 4 | 12 | 0 | 132 (910) | adhesive |

Table 9 shows that adhesives with mixed oxirane and aziridne functionality can demonstrate excellent adhesion to iPP, and that the level of adhesion is influenced by the amount of Lewis acid catalyst and the amount of aziridine present in the mixture.

EXAMPLES 61 to 63

Examples 61 to 63 were performed utilizing different alkylborane amine initiators for acrylic polymerization. In all cases the substrate was iPP. The formulation was in each case 58 percent acrylic resin, 20 percent TRIS, 10 percent GMA, 4 percent $BF_3O(Me)_2$, 4 percent TBB-IPDA complex and 4 percent of a decomplexing agent, except when there was no decomplexing agent used other than the $BF_3$ then the resin content was 62 percent. The results are compiled in Table 10.

TABLE 10

| Example | initiator | Lap shear strength psi (kPA) | Failure mode |
|---|---|---|---|
| 61 | AA | 640 (4413) | substrate |
| 62 | IPDI | 453 (3123) | substrate |
| 63 | $BF_3$ | 481 (3316) | substrate |

Table 10 shows three classes of the alkylborane-amine catalyst initiators that can be effectively used as adhesive components in the present invention.

EXAMPLES 64 to 68

Examples 64 to 68 illustrate compositions of the invention with the inclusions of aziridine functionalized monomers and isocyanate the decomplexling agent. Aziridine was present in Examples 65 to 68. Example 64 does not contain an aziridine component. The adhesives were formulated so as to result in integer mix ratios convenient for industrial processes (R:H is the volume ratio of the part with the resin (acrylate-containing part) to the part with the hardener (trialkylborane amine containing part)). The aziridine functionalized monomer in each case was TRIZ. In each case the alkyl borane amine catalyzed acrylic polymerization was initiated with IPDI, the amine (Am) was IPDA, and the Lewis acid was the diethyletherate of $BF_3$. In all cases the molar equivalence of isocyanate functionality was equal to that of amine. In some of the experiments a phase crosslinker was added. On the resin side (Table 12), acrylic resin is added to make 100 grams total (100 weight percent). The hardener (Table 11) is formulated in the table as grams which, when combined with 100 grams of resin, result in the R:H volumetric ratio given. The results are compiled in Table 13.

TABLE 11

Formulation of hardener side of adhesive for experiments using aziridine containing monomers. All units in grams. Add wt means additive weight.

| Example | TBB | VS5500 | Am | TRIZ | Additive | Add wt | R:H |
|---|---|---|---|---|---|---|---|
| 64 | 2.31 | 6.16 | 5.99 | 0 | TEPA | 1.05 | 4:1 |
| 65 | 2.62 | 11.66 | 1.35 | 12.75 | GMA | 2.62 | 2:1 |
| 66 | 4.86 | 0.0 | 6.92 | 13.22 | none | 0.0 | 1:1 |
| 67 | 2.68 | 10.05 | 7.87 | 13.4 | none | 0.0 | 2:1 |
| 68 | 2.68 | 10.05 | 7.87 | 10.72 | GLY | 2.68 | 2:1 |

TABLE 12

Formulation of resin side of adhesive for experiments using aziridine containing monomers. All units in weight percent.

| Example | IPDI | $BF_3O(Et)_2$ | EGDM | ICEMAN | VS5500 |
|---|---|---|---|---|---|
| 64 | 12.6 | 0 | 2 | 2 | 0 |
| 65 | 3.04 | 5.24 | 2 | 2 | 0 |
| 66 | 23.87 | 2.43 | 2 | 2 | 20 |
| 67 | 10.17 | 2.68 | 2 | 2 | 0 |
| 68 | 9.9 | 2.68 | 2 | 2 | 0 |

TABLE 13

Results for lap shear tensile measurements using adhesive formulation described by experiments 64–68. All 25° C. experiments use iPP and all 150° C. experiments use nylon substrates.

| Example | Lap shear 25° C. psi (kPA) | failure | Lap shear 150° C. psi (kPA) | failure |
|---|---|---|---|---|
| 64 | 615 (4240) | substrate | 340 (2344) | ca |
| 65 | 624 (4302) | substrate | 353 (2434) | ca |
| 66 | 139 (958) | ca | 491 (3385) | ca |
| 67 | 155 (1069) | ca | 686 (4730) | ca |
| 68 | 302 (2082) | ca | 590 (4068) | ca |

The data in Table 13 shows that adhesives containing aziridine functional monomers can provide excellent high temperature and low temperature adhesion to low surface energy plastic substrates.

EXAMPLES 69 to 72

Examples 69 to 72 were performed to test if $BF_3$ complexed to tertiary amines can efficiently catalyze polymerization of the oxirane or aziridine functionalized monomer in the adhesives of this invention for a room temperature cure. In the following experiments all formulations consisted of 20 percent by weight of the indicated oxirane containing monomer. All of the formulations consisted of 10 percent by weight of glycidyl methacrylate as a phase crosslinker. All of the formulations catalyzed radical polymerization using a TBB:MOPA complex and acrylic acid as an initiator, both 4 percent by weight of the total formulation. All bonded substrates were cured for 48 hours at room temperature. All formulations used a $BF_3$ catalyst complexed with amine from Leepoxy Products (Ft. Wayne, Ind.), called B614, which has a nominal cure time for oxirane monomers of 13 minutes according to the manufacturer. All formulations contained 10 percent by weight $BF_3$:amine complex based on the total weight of the formulation. All lap shear measurements were performed at 25° C. The results are compiled in Table 14.

TABLE 14

| Example | Oxirane monomer | substrate | Lap shear strength psi (kPA) | failure |
|---|---|---|---|---|
| 69 | TRIS | iPP | 342 (2358) | mixed |
| 70 | TRIS | nylon | 464 (3199) | ca |
| 71 | PPGEF | iPP | 369 (2544) | a |
| 72 | PPGEF | nylon | 431 (2972) | ca |

The data in Table 14 shows that excellent adhesion can be obtained with a variety of oxirane containing monomers on a variety of low surface energy substrates using Lewis acid catalysts complexed to amines providing room temperature cure.

EXAMPLES 73 to 81

Examples 73 to 81 demonstrate the adhesives of the present invention for adhesion to nylon substrates with only room temperature curing. Adhesives are formulated according to the weight percentages in the table with the balance to 100 percent being made up in acrylic resin. In each case the alkylborane:amine complex (H) is TnBB:MOPA, the oxirane is DER 331 (DEGBA), and the weight percentage of BF$_3$O(Me)$_2$ is 4 percent of the total adhesive weight. The results are compiled in Table 15.

TABLE 15

| Example # | AA | Percent H | Percent DER | Percent GMA | Test temp. °C. | Lap shear psi kPA | Failure |
|---|---|---|---|---|---|---|---|
| 73 | 4 | 4 | 16 | 0 | 25 | 1817 (12528) | a |
| 74 | 4 | 2 | 18 | 0 | 25 | 1475 (10170) | a |
| 75 | 6 | 4 | 16 | 0 | 25 | 1935 (13341) | ca |
| 76 | 8 | 4 | 16 | 0 | 25 | 2522 (17388) | ca |
| 77 | 8 | 4 | 16 | 0 | 125 | 400 (2758) | ca |
| 78 | 8 | 4 | 16 | 5 | 25 | 2538 (17499) | ca |
| 79 | 8 | 4 | 16 | 5 | 125 | 581 (4005) | ca |
| 80 | 8 | 4 | 16 | 10 | 25 | 2636 (18175) | ca |
| 81 | 8 | 4 | 16 | 10 | 125 | 650 (4482) | ca |

Table 15 shows that outstanding room temperature and high temperature adhesion to nylon can be obtained with the current invention with no surface priming, a room temperature cure, and with DGEBA. Table 15 also shows that the adhesion is improved with additional acrylic acid initiator and GMA crosslinker in the formulation.

What is claimed is:

1. A two part polymerizable composition comprising in one part an organoborane amine complex and one or more compounds containing at least one heterocyclic ring opening moiety, and in the second part a Lewis acid catalyst capable of initiating polymerization of the compounds containing heterocyclic ring opening functionality and compounds capable of free radical polymerization, wherein the compound containing at least one heterocyclic ring opening moiety is a three membered oxygen containing ring.

2. A two part composition according to claim 1 wherein the second part further contains a decomplexing agent capable of decomplexing the organoborane amine complex upon contacting the two parts.

3. A two part composition according to claim 2 where the compound containing a ring opening moiety comprises at least about 10 percent by weight to about 50 percent by weight; the Lewis acid comprises at least about 0.1 percent by weight to about 10 percent by weight; and the organoborane amine complex comprises about 1 percent by weight to about 8 percent by weight of the composition.

4. The two part composition according to claim 3 where the Lewis acid is an amine or ether complex of BF$_3$ or SnCl$_4$.

5. The two part composition according to claim 4 which further comprises a di-functional compound capable of reacting with compounds containing a heterocylic ring opening moiety and compounds capable of free radical polymerization.

6. The two part composition according to claim 5 in which the di-functional compound is present in an amount of from about 1 to about 15 percent by weight of the total composition.

7. The two part composition according to claim 6 wherein the organoborane amine complex comprises a trialkyl borane or an alkyl cycloalkyl borane and the amine comprises a primary amine; a secondary amine; a polyamine having primary or secondary amines or both; ammonia; polyoxyalkylene amines; the reaction product of a diamine and a difunctional compound having moieties which react with an amine, wherein the reaction product has terminal amine groups; aryl amines; heterocyclic amines; a compound having an amidine structural component; aliphatic heterocycles having at least one secondary nitrogen in the heterocyclic ring wherein the heterocyclic compound may also contain one or more additional secondary or tertiary nitrogen atoms, oxygen atoms, sulfur atoms, or double bonds in the heterocycle; alicyclic compounds having bound to the alicyclic ring one or more substituents containing an amine moiety; conjugated imines; or mixtures thereof.

8. A composition according to claim 7 wherein the organoborane amine complex is one of the following classes:

organoborane alkylamine complex corresponds to the general formula

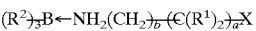

the organoborane heterocyclic amine complex corresponds to the formula

the organoborane amidine complex corresponds to the formula

the organoborane conjugated imine complex corresponds to the formula

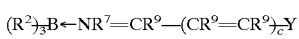

the organoborane alicyclic compound with an amine containing substituent corresponds to the formula

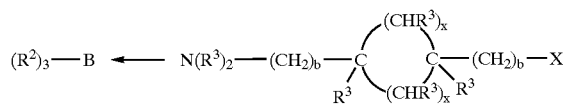

wherein B is boron;

R$^1$ is separately in each occurrence hydrogen, a C$_{1-10}$alkyl or C$_{3-10}$cycloalkyl;

R$^2$ is separately in each occurrence a C$_{1-10}$alkyl, C$_{3-10}$cycloalkyl or two or more of R$^2$ may combine to form a cycloaliphatic ring structure;

R$^3$ is separately in each occurrence hydrogen, a C$_{1-10}$alkyl or C$_{3-10}$cycloalkyl; R$^4$ is separately in each occurrence hydrogen, C$_{1-10}$alkyl, C$_{3-10}$cycloalkyl, C$_{6-10}$aryl or C$_{6-10}$alkaryl; R$^5$ is separately in each occurrence hydrogen, C$_{1-10}$alkyl, or C$_{3-10}$cycloalkyl;

R$^6$ is separately in each occurrence hydrogen, a C$_{1-10}$alkyl, C$_{3-10}$cycloalkyl or —N(R$^5$)$_2$;

R$^7$ is separately in each occurrence hydrogen, C$_{1-10}$alkyl or C$_{3-10}$cycloalkyl;

two or more of R$^5$, R$^6$ and R$^7$, in any combination, can combine to form a ring structure which can be a single ring or a multiple ring structure and the ring structure can include one or more of nitrogen, oxygen or unsaturation in the ring structure;

R$^9$ is independently in each occurrence hydrogen, C$_{1-10}$alkyl or C$_{3-10}$cycloalkyl, Y, —(C(R$^9$)$_2$—(CR$^9$=CR$^9$)$_c$-Y or two or more of R$^9$ can combine to form a ring structure, or one or more of R$^9$ can form a ring structure with Y provided the electron rich group in Y is conjugated with respect to the double bond of the imine nitrogen;

X is a hydrogen-bond accepting group,;

Y is independently in each occurrence hydrogen, —N(R$^4$)$_2$, —OR$^4$, —C(O)OR$^4$, a halogen or an alkylene group which forms a cyclic ring with R$^9$;

Z is separately in each occurrence oxygen or —NR$^4$;

a is separately in each occurrence an integer of from about 1 to about 10;

b is separately in each occurrence 0 or 1, with the proviso that the sum of a and b should be from about 2 to about 10;

c is separately in each occurrence an integer of from about 1 to about 10;

x is separately in each occurrence an integer of about 1 to about 10, with the proviso that the total of all occurrences of x is from about 2 to about 10; and y is separately in each occurrence about 0 or 1.

9. A method of polymerization comprising contacting the components of the polymerizable composition of claim 1 under conditions such that the one or more compounds containing a heterocyclic ring opening moiety and the compounds capable of free radical polymerization undergo polymerization.

10. The method of claim 9 wherein the contacting occurs at, or near, ambient temperature.

11. The method claim 10 which further comprises the step of heating the composition to an elevated temperature under conditions such that the one or more compounds containing a heterocyclic ring opening may react further.

12. A method of bonding two or more substrates together which comprises:
   a. contacting the components of the composition of claim 1 together under conditions such that polymerization is initiated;
   b. contacting the adhesive composition with the two or more substrates;
   c. positioning the two or more substrates such that the adhesive composition is located between the two or more substrates wherein they are in contact with one another; and
   d. allowing the adhesive to cure so as to bind the two or more substrates together.

13. A method of bonding two or more substrates according to claim 12 which further comprises heating the adhesive composition to a temperature such that the one or more compounds containing a heterocyclic ring opening moiety may react further.

14. A method of modifying the surface of a low surface energy polymer by contacting a composition according to claim 1 with at least a portion of the surface of the low surface energy polymer and causing the organoborane amine complex to disassociate thereby initiating polymerization of the monomer, oligomers, polymers or mixture thereof such that the polymer formed is on the surface of the low surface energy polymer.

15. A method of coating a substrate which comprises contacting the components of the composition of claim 1; contacting the contacted composition with one or more surfaces of a substrate; and allowing the coating composition to cure.

16. A coating composition which comprises the composition of claim 1.

17. A laminate comprising at least two substrates having disposed between the substrates and bound to each substrate a composition according to claim 1.

* * * * *